(12) United States Patent
Chen et al.

(10) Patent No.: US 10,909,952 B2
(45) Date of Patent: Feb. 2, 2021

(54) INFORMATION TERMINAL

(71) Applicant: GUANGDONG XIAYE HOUSEHOLD ELECTRICAL APPLIANCES CO., LTD, Guangdong (CN)

(72) Inventors: Ziping Chen, Guangdong (CN); Mengzhen Chen, Guangdong (CN); Jiehui Liu, Guangdong (CN)

( * ) Notice: Subject to any disclaimer, the term of this patent is extended or adjusted under 35 U.S.C. 154(b) by 0 days.

(21) Appl. No.: 16/617,989

(22) PCT Filed: May 30, 2018

(86) PCT No.: PCT/CN2018/088995
§ 371 (c)(1),
(2) Date: Nov. 27, 2019

(87) PCT Pub. No.: WO2018/219288
PCT Pub. Date: Dec. 6, 2018

(65) Prior Publication Data
US 2020/0111449 A1   Apr. 9, 2020

(30) Foreign Application Priority Data

Jun. 2, 2017  (CN) .......................... 2017 1 0406807

(51) Int. Cl.
*G09G 5/10* (2006.01)
*G09G 5/02* (2006.01)

(52) U.S. Cl.
CPC ................ *G09G 5/10* (2013.01); *G09G 5/02* (2013.01); *G09G 2320/0233* (2013.01);
(Continued)

(58) Field of Classification Search
CPC .... G09G 5/10; G09G 5/02; G09G 2320/0233; G09G 2320/0626; G09G 2320/0666; G09G 2320/068
See application file for complete search history.

(56) References Cited

U.S. PATENT DOCUMENTS

| 10,665,204 B1 * | 5/2020 | Goodsitt | G09G 5/10 |
| 2009/0231364 A1 * | 9/2009 | Tsai | G09G 5/10 |
| | | | 345/690 |

(Continued)

FOREIGN PATENT DOCUMENTS

| CN | 101193140 A | 6/2008 |
| CN | 101436394 A | 5/2009 |

(Continued)

OTHER PUBLICATIONS

U.S. Appl. No. 16/617,991, Information Terminal.
U.S. Appl. No. 16/617,997, Information Terminal.

*Primary Examiner* — Peter D McLoone
(74) *Attorney, Agent, or Firm* — Welsh Flaxman & Gitler LLC

(57) ABSTRACT

The embodiments of the present invention relate to an information terminal, comprising a display screen and a communication device, and also comprising a camera, a photo capturing unit, a photo gray level analysis unit and a display screen display parameter adjustment unit. The camera is used for acquiring a photo analog signal or a photo digital signal of a background environment within the viewing angle of a user, the photo capturing unit converts the photo analog signal or the photo digital signal acquired by the camera into digital photo data; the photo gray level analysis unit analyzes the gray level of the photo data, generates state parameters of the background environment within the viewing angle of the user according to configuration parameters of the camera, and sends the same to the display-screen display parameter adjustment unit; and the display screen display parameter adjustment unit adjusts the display parameters of the display screen according to the state parameters of the background environment on the basis of a preset correspondence relationship, so that the display (Continued)

parameters of the display screen match with the lighting state of the background environment within the viewing angle of the user.

9 Claims, 2 Drawing Sheets

(52) U.S. Cl.
CPC ............... *G09G 2320/068* (2013.01); *G09G 2320/0626* (2013.01); *G09G 2320/0666* (2013.01)

(56) References Cited

U.S. PATENT DOCUMENTS

| | | |
|---|---|---|
| 2010/0265263 A1 | 10/2010 | Hsu et al. |
| 2011/0032228 A1 | 2/2011 | Ho |
| 2011/0181541 A1 | 7/2011 | Kuo |

FOREIGN PATENT DOCUMENTS

| | | |
|---|---|---|
| CN | 101534395 B | 2/2011 |
| CN | 102693698 A | 9/2012 |
| CN | 106453888 A | 2/2017 |
| CN | 106502512 A | 3/2017 |
| CN | 106683639 A | 5/2017 |

* cited by examiner

INFORMATION TERMINAL

This application claims priority from Chinese patent application of No. 201710406807.9, entitled an information terminal, filed on Jun. 2, 2017, in National Intellectual Property Administration, PRC.

TECHNICAL FIELD

The present invention relates to a technical field of lighting, in particular to an information terminal.

RELATED ART

At present, the development of internet electronic products such as mobile phones, tablets are on the rise, more and more people are staring at video terminals such as mobile phones for a long time, causing visual fatigue of human eyes which results in visual extinction and effects visual health.

Currently, most of the smart phones have their own automatic brightness adjustment mode, the illumination sensor located near the receiver, by recognizing surrounding lighting environment, detects the brightness of the surrounding environment, and then calculates the screen display brightness according to the preset algorithm.

However, the user often encounters the brightness display of the screen in the automatic adjustment mode, which does not adapt to his visual perception. The reason is that there is an error between the brightness of the surrounding environment detected by the brightness sensor and the visual perception, and adjustment only for brightness has limitation. And there is no better method to solve the above problem at present in the industry.

SUMMARY OF THE INVENTION

The object of embodiments of the present invention is to provide an information terminal, which may sample illumination of a background environment based on viewing angle range of a user , and adjust display parameters such as a brightness and a color temperature of a display screen according to state parameters of the background environment obtained by sampling, and adjust the display parameters such as the brightness and the color temperature matching with the lighting state of the background environment within the viewing of the user, so that it is possible for the screen display to match with the visual perception of the user. Therefore, it may effectively reduce the visual fatigue of the user during use and protect the visual health of the user.

In order to achieve the object, the embodiments of the present invention provide an information terminal, comprising a display screen and a communication device, wherein the information terminal further comprises a camera, a photo capturing unit, a photo gray level analysis unit and a display-screen display-parameter-adjustment unit, and the camera is used for acquiring a photo analog signal and a digital signal of a background environment within a viewing angle range of a user;

the photo capturing unit is connected to the camera through the communication device, for converting the photo analog signal or the photo digital signal acquired by the camera into digital photo data, the photo gray level analysis unit analyzes a gray level of the photo data, generates state parameters of the background environment within the viewing angle range of a user according to configuration parameters of the camera, and sends the same to the display screen display-parameters-adjustment unit, and the display-screen display-parameter-adjustment unit adjusts the display parameters of the display screen according to the state parameters of the background environment on the basis of the preset correspondence relationship, so that the display parameters of the display screen match with the lighting state of the background environment within the viewing of the user, and wherein the display parameters include brightness and/or color temperature at least.

Preferably, the information terminal is connected to a Cloud through a network, for transmitting parameters of the preset correspondence relationship in which the display parameters of the display screen match with the lighting state of the background environment within the viewing angle of the user to the Cloud for synchronization, and the Cloud stores a user habit list corresponding to the user, which includes a user ID corresponding to the user, the display parameters of the display screen, the lighting state and the preset correspondence relationship in which the display parameters match with the lighting state of the background environment within the viewing angle range of the user.

More preferably, the display-screen display-parameter-adjustment unit comprises an adjustment device for adjusting the display parameters of the display screen, and after the display parameters are adjusted, the preset correspondence relationship between the display parameters and the lighting state of the background environment within the viewing angle range of the user is changed, and a corrected correspondence relationship is generated.

More preferably, the Cloud performs data analysis on the correspondence relationship in which the display parameters of the display parameter match with the lighting state of the background environment within the viewing angle range of the user, and the parameters of the corrected correspondence relationship, a universal preset correspondence relationship adaptive to the first range and a peculiar preset correspondence relationship adaptive to the second range are generated.

More preferably, the cloud performs data analysis comprises:

the cloud calculating a degree and amount of deviation between the corrected correspondence relationship and the preset correspondence relationship, and performing weight processing on the preset correspondence relationship and the corrected correspondence relationship that reach a first deviation amount and less than a first deviation threshold, thereby a universal preset correspondence relationship of the first range is generated, and performing weight processing on the preset correspondence relationship and the corrected correspondence relationship that reach a second deviation amount and less than a second threshold, thereby a peculiar preset correspondence relationship of the second rang is generated.

More preferably, the universal preset correspondence relationship is get from the cloud through the information terminal of the common user, to match the display parameters of the display screen with the lighting state of the background environment with the viewing angle range of the user, and the particular preset correspondence relationship is get from the cloud through the information terminal of the special user, to match the display parameters of the display screen with the lighting state of the background environment within the viewing angle range of the user.

More preferably, the cloud performs data analysis with the correspondence relationship in which the display parameters of the display screen match with the lighting state of the background environment within the viewing angle range of the user and the parameters of the corrected correspondence relationship, and generates a universal preset correspondence relationship adaptive to the first range and a peculiar preset correspondence relationship adaptive to the second range, including:

the cloud determining user properties corresponding to the corrected correspondence relationship, the cloud determining the data correction weight coefficient according to the user properties, the cloud performing the data analysis processing on the parameters of the corrected correspondence relationship according to the data correction weight coefficient, and obtaining parameters of a normalized correction correspondence relationship, and the cloud performing data analysis on the correspondence relationship in which the display parameters of the display screen match with the lighting state of the background environment within the viewing angle range of the user and the parameters of a normalized correction correspondence relationship, and generating the universal preset correspondence relationship adaptive to the first range and the particular preset correspondence relationship adaptive to the second range.

More preferably, that adjusts the display parameters of the display screen according to the state parameters of the background environment comprises: determining an absolute value of a target brightness according to the state parameters of background environment and the preset correspondence relationship;

determining a percentage of a display brightness of the display screen according to the absolute value of the target brightness; and outputting an actual display brightness corresponding to the absolute value of the target brightness according to the percentage of a display brightness of the display screen, wherein the actual display brightness of the display screen and a maximum absolute value of brightness of the display screen are calibrated through the percentage of the display brightness in advance.

Preferably, the photo capturing unit further includes:

generating a counter-compensation parameter according to the type parameter of the camera and/or a self-compensation parameter, and converting the photo analog signal or the photo digital signal acquired by the camera into digital photo data based on the counter-compensation parameter.

The embodiments of the present invention provide an information terminal, which can sample the illumination of a background environment based on viewing angle range of a user, and adjusts the display parameters such as the brightness and the color temperature of the display screen according to the state parameters of the background environment obtained by sampling, to match the lighting state of the background environment within the viewing of the user, so that the screen display matches with the visual perception of the user, resulting in that the visual fatigue of the user during use is effectively reduced and the visual health of the user is protected.

DETAILED DESCRIPTION OF THE INVENTION

The technical scheme of the present invention is further described in detail by figure and embodiments.

In order to better understand the information terminal proposed in the embodiments of the present invention and its working mode, firstly, the visual impact of ambient light on the user when viewing the display screen will be described.

During the user watches the display screen, the lighting state of the background environment has a great influence on the visual effect of the display screen. When the human eye watches any object, the size of the pupil can be adjusted according to the brightness of the object, and the brighter the brightness, the smaller the pupil, the lower the brightness, the bigger the pupil. Usually, the visual range of the display screen we watch is only within 10% of the visual range of our eyes.

For example, when using a 5-inch display screen mobile phone, the mobile phone is placed at a distance of about 30 cm from the eye, the visual solid angle of our eyes is about 120 degrees, and the visual range of the eyes at 30 cm is about 8482 cm$^2$, while the area of the 5-inch display screen mobile phone is no more than 100 cm$^2$, the display screen of the mobile phone is less than 2% of the visual range of the eyes. For example, when using a computer with a 20-inch display screen, the display screen is placed at a distance of about 50 cm from the eye, at this time, the visual range of the eye at 50 cm is about 23562 cm$^2$, and the area of the 20-inch computer display screen is no more than 1200 cm$^2$, the computer display screen is no more than 6% of the visual range of the human eyes. Therefore, the pupil size of the eye is mainly affected by the lighting state of the background environment of the display screen. In order to make the user more comfortable when using the display screen, the brightness of the display screen must be adjusted according to the size of the pupil, that is, being adjusted according to the lighting state of the background environment of the display screen.

Therefore, in a different background environment, if the display screen of the information terminal may adjust the display according to the external environment, in particular to the display parameters such as the brightness that matches with environment within the viewing angle of a user, and the color temperature, the visual health of the user to a certain degree will be protected.

The brightness adjustment of the information terminal of the display screen of the present invention is especially suitable for a dark lighting environment.

The information terminal of the present invention includes but not limited to smart phones, Personal Digital Assistant (PDA)s, desktop computers, televisions and projectors.

Figure 1:
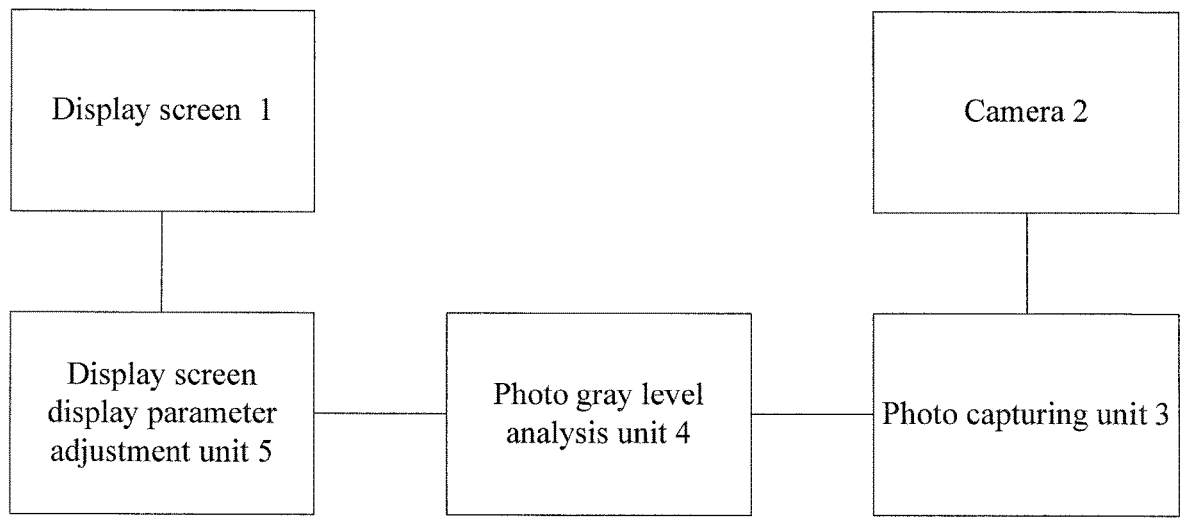
FIG. 1 is a structure schematic diagram of an information terminal according to an embodiment of the present invention.
Figure 2:
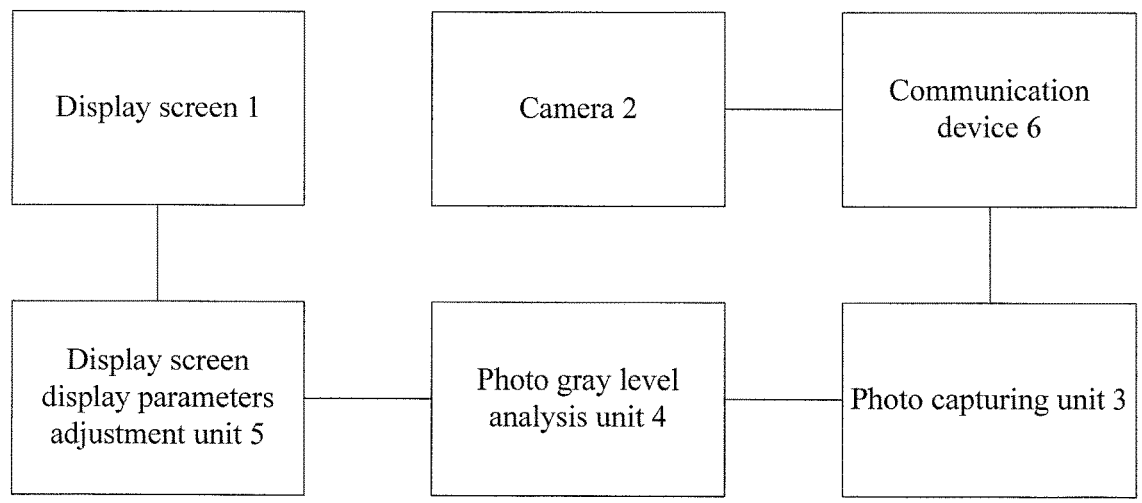
FIG. 2 is a structure schematic diagram of another information terminal according to an embodiment of the present invention.

FIG. 1 and FIG. 2 are respectively the schematic diagrams of two implementations of the information terminal provided by the embodiment of the present invention. As shown in the figures, the information terminal according to the embodiments of the present invention comprises: a display screen 1, a camera 2, a photo capturing unit 3, a photo gray level analysis unit 4 and a display-screen display-parameter-adjustment unit 5.

The display screen 1 is for performing image display with the output information of the information terminal. Take a smart phone as an example, there are various display screen 1 available which are different depending on the quality of the liquid crystal display (LCD) and the development technology, and the type of which may roughly include TFT, TFD, UFB, STN and OLED.

The camera 2 is used for acquiring a photo analog signal or a digital signal of a background environment within the viewing angle range of a user. As shown in FIG. 2, the communication device 6 performs data interaction with other modular units in the body of the information terminal. In order to ensure that the image captured by the camera 2 is consistent with the viewing angle range of the user, the lens optical axis of the camera 2 needs to be set perpendicular to the display screen or set substantially perpendicular to the display screen, which is set within ±30° of the vertical axis of the display screen optical axis. This is because the optical axis of the user's eye when the user is using the information terminal is usually perpendicular or substantially perpendicular to the display screen. Of course, the purpose of this setting is to ensure that the sampling range of the camera 2 is as close as possible to the user's visual range. In a specific application, the settings of the camera 2 can be set according to the actual usage of the user. In particular, for the placement position of the camera 2, the camera 2 may be integrally provide on the information terminal, or may be provided separately from the body of the information terminal.

When using an information terminal such as a smart phone or a table computer, the distance between the eyes and the terminal is usually about 30 cm. Since this kind of information terminal is a portable product, it will be moved along with people's activities, the background of the terminal is usually wide-open on these circumstances, in this case, the proper placement position of the camera 2 is integrated on the information terminal. Thereby, under the circumstances where the camera 2 is configured the same angle as the image capturing angle of the user eyes, the background acquired by the camera 2 integrated on the information terminal is close to the background observed within the viewing angle range of the user.

As a user watches TV or projector hanging against the wall, the space of the background behind the display screen is very small, and the background object is close to the backface of the display screen, however, the distance between the position of the user's eyes and the display screen is far, usually about more than 2 m or even beyond. In this case, the proper placement position of the camera 2 is arranged near the head of the user as an external camera approaching the user's eyes. Thereby, under the circumstances where the camera 2 is configured the same angle as the image capturing angle of the user eyes, the lighting state of the background environment obtained by the camera 2 arranged near by the user's eyes is more scientific and accurate.

When using an information terminal such as a desktop computer, the distance between the use's eyes position and computer screen is approximately 50 cm. However, the space of the back of the computer screen is defined by the actual condition. when the computer screen is far away from the background object, the background space range is wide-open, in this case, the proper placement position of the camera 2 is arranged around the desktop computer. However, when the computer screen is close to the background object, the background space range is small, in this case, the proper placement position of the camera 2 is close to the user's eyes. Thereby, it is particularly important to arrange camera 2 in a proper placement position according to the actual situation.

The camera 2 may be CCD or CMOS sensor. Those two kinds of image sensors are commonly used at present, both of which use photodiodes for photoelectric conversion to collect image information, and the main difference is that data is transmitted in different ways. The charge data of each pixel in each row of the CCD sensor is sequentially transferred to the next pixel, output by the bottommost portion, then amplified and output by the amplifier at the edge of the sensor. However, in the CMOS sensor, each pixel will be adjacent to an amplifier and A/D conversion circuit, and output data in a manner similar to a memory circuit.

The photo capturing unit 3 is arranged inside the information terminal, and connected with the camera 2 by wire connection as shown in FIG. 1, or connected with the camera 2 through communication device 6 via wirelessly connection as shown in FIG. 2. The photo capturing unit 3 coverts the photo analog signal or the photo digital signal acquired by the camera 2 into digital photo data.

The photo gray level analysis unit 4 is connected to the photo capturing unit 3, analyzes the gray level of the photo data transmitted by the photo capturing unit 3, and generates state parameters of the background environment within the viewing angle range of the user according to configuration parameters of the camera, and sends the same to the display-screen display-parameter-adjustment unit 5.

The photo gray analysis unit 4 is a module having data processing function such as a processing chip or circuit unit with particular logic, which performs analyzing the gray level of the photo data to determine the illuminate state of the background environment for generating the corresponding state parameters.

The display-screen display-parameter-adjustment unit 5 is connected to the photo gray level analysis unit 4 and the display screen 1 respectively. The display-screen display-parameter-adjustment unit 5 adjusts the display parameters of the display screen according to the state parameters of the background environment on the basis of the preset correspondence relationship, so that the display parameters of the display screen match with the lighting state of the background environment within the viewing of the user.

Wherein, the display parameters at least include brightness and/or color temperature. It should be understood that during shooting, different parameters of the camera lens such as an aperture, a shutter speed, and a focal length will have certain influence on the sampling image of the background environment, which may cause the background sampling image to be different from the actual one.

Therefore, in a preferably embodiment, in accordance with the capture parameters of the camera lens, A correction calculation of the display parameter of the display screen is performed based on a preset algorithm, thereby the deviation caused by sampling is corrected, so that the display screen is matched with an actual lighting state of the background environment within the viewing angle range of the user according to the corrected display parameters.

In this embodiment, that the parameter control of the display screen is to control an actual display. In this process, the difference in image capturing between the lens model of different manufacturers and the self-compensation of the image is considered.

Take the brightness control as an example, the brightness of the actual display is controlled. We employ a method for controlling the maximum brightness percentage to control the brightness of the actual display. It includes determining an absolute value of a target brightness according to the state parameters of background environment and a preset correspondence relationship, determining a display brightness percentage of the display screen according to the absolute value of the target brightness, and outputting an actual display brightness corresponding to the absolute value of the target brightness according to the brightness percentage, wherein, the maximum absolute value of brightness of the display screen are calibrated in advance through the brightness percentage to obtain the actual display brightness of the display screen.

Furthermore, according to the type parameter of the camera and/or self-compensation the photo capturing unit 3 generates a counter-compensation parameter, and converts the photo analog signal or the photo digital signal acquired by the camera into digital photo data based on the counter-compensation parameter.

In the embodiment, there is a preset correspondence relationship between the ambient light conditions of the background environment and the display parameters of the display screen, and the data of the correspondence relationship may be stored locally in the information terminal or stored in the cloud.

Further, the local store storage may be stored in a memory (not shown in the figures) of the information terminal. The memory can be a ROM chip or any other type of solid state non-volatile semiconductor memory. The manner of writing into the memory can be implemented by a wired input method, or by an interface connected to the memory, such as an infrared interface, a Bluetooth interface, a USB interface etc.

The preset correspondence relationship may include a correspondence relationship of the state parameter for adjusting the brightness obtained by the gray level analysis result, and a correspondence relationship of the state parameter for adjusting the color temperature obtained by the gray level analysis result.

There is an achievable method relating to a method for determining the state parameters to adjust brightness from the gray level analysis, presented in this embodiment.

A black and white camera is used to take a picture of the background environment within the viewing angle range of the user. A black and white photo is obtained, the image data of this black and white photo is taken out, and divided into M×N blocks, for example, assuming 10×10 blocks, and the quantization parameter of each block is determined, for example, black is defined to 0 and white to 1. The number of levels in each block area is counted and accumulated, and the total number of stage 10×10 is divided to obtain the percentage, which is the brightness ratio of the black and white photo. For example, in the above example, 50 blocks are black and 50 blocks are white, and the brightness ratio is 50%. Thereby, the brightness ratio obtained by the black and white analysis combined with the setting parameters of the black and white camera can generate the brightness state parameter of background environment within the viewing angle range of the user.

A black and white camera is used to take a picture of the background environment within the viewing angle of the user. A black and white photo is obtained, the image data of this black and white photo is taken, and divide into M×N blocks, for example, assuming 10×10 blocks. and the gray value of each block area is quantified, usually the 256 level are divided from 0 to 255, wherein, 0 is the darkest (black) and 255 is the brightest (white). The number of the gray levels are counted and accumulated in each block, and the total level 10×10×256 are divided to obtain the percentage, which is the brightness ratio of the black and white photo. Thereby, the brightness ratio obtained by the gray analysis combined with the setting parameters of the black and white camera can generate the brightness state parameter of background environment within the viewing angle range of the user.

Alternatively, the gray level may be divided into smaller number of levels such as 8 levels, to perform the calculation.

There is an achievable method for determining the state parameters for adjusting the brightness and the color temperature from the result of the gray level analysis, in this embodiment.

A color camera is utilized to take a picture of the background environment within the viewing angle range of a user. A color photo is obtained, the image data of this color photo is extracted, and the photo is decomposed into three photos with color of red, green and blue by means of RGB three primary color decomposition function, and average value of the R/G/B channel components of the three photo is converted into the gray value according to weighted correspondence relationship. Then the image data of the red component photo is extracted, the photo is divided into M×N blocks, for example, assuming 10×10 blocks. the gray value of each block is quantized, usually the level is divided into 256 from 0 to 255, of which, 0 is the darkest (black), 255 is the brightest (white). and the number of the gray levels is counted and accumulated in each block, and the total level 10×10×256 is divided to obtain the percentage, which is the brightness ratio of the red component photo. Similarly, the brightness ratio of the green component photo and the blue component photo may be analyzed and calculated. Finally, the brightness ratio of the three photos is superimposed to obtain the brightness ratio of the color photo. Thereby, the brightness ratio obtained by the gray analysis combined with the setting parameters of the color camera may generate the brightness state parameter of background environment within the viewing angle range of the user.

Then, the photos of the three-color components decomposed by the color camera are combined, the remain R/G/B channel components of each region after synthesized into the valid standard white pixel is analyzed and statistic. If the red component is large, the photo tends to be warm, and if the blue component is large, the photo tends to be cold. Thereby, the color temperature state parameter of the specific colorful photograph may be obtained by means of analyzing the component ratio of the R/G/B color. Therefore, the brightness and color temperature state parameters obtained by the gray analysis combining with the configuration parameter of the color camera may generate the brightness and color temperature of the background environment within viewing angle range of the user.

Furthermore, the display-screen display-parameter-adjustment unit 5 comprises the adjustment device (not shown in the FIG) which is used for changing the preset correspondence relationship to match the display parameters of the display screen with the lighting state of the background environment within the viewing angle range of the user. The adjustment device may be a hardware module configured inside the information terminal, or a software module configured on the display screen. After the display parameters are adjusted, the correspondence relationship between the display parameter of display screen and the lighting state of the background environment within the viewing angle range of the user is changed, and then a corrected correspondence relationship is generated.

Figure 3:
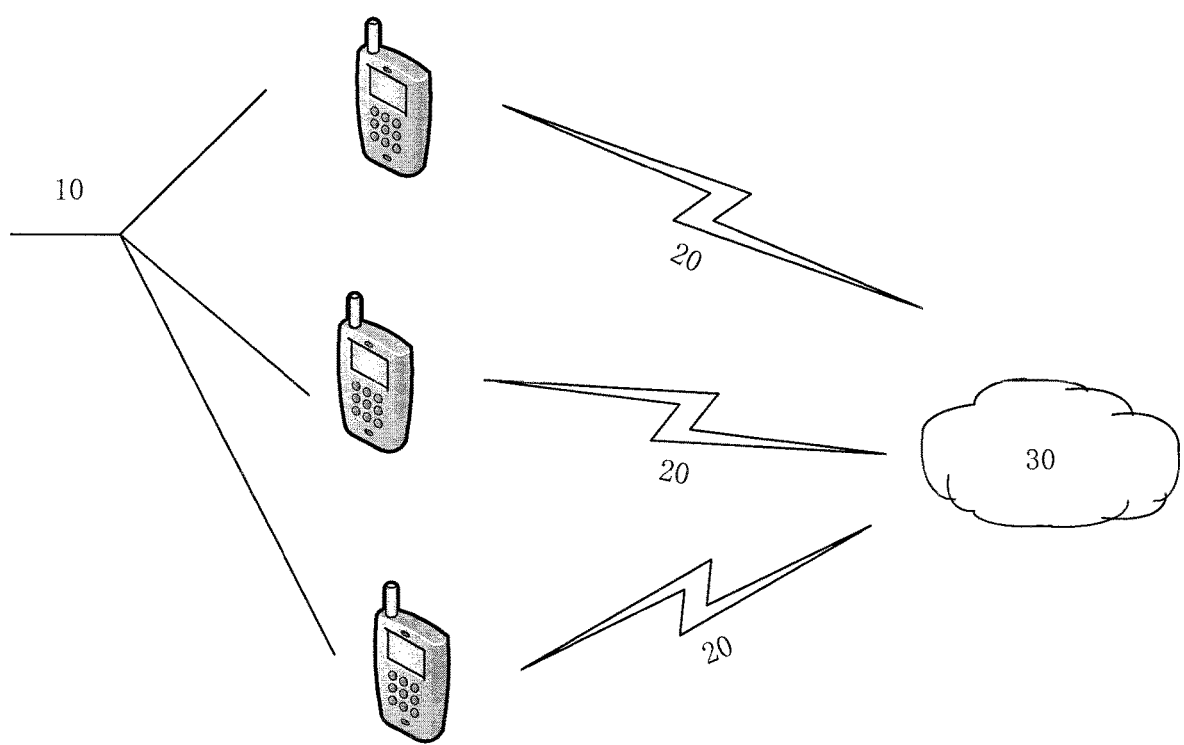
FIG. 3 is a structure diagram of the system with multiple information terminals according to an embodiment of the present invention.

Furthermore, as shown in the FIG. 3, in the system connected to the cloud, each information terminal 10 may connect to the cloud 30 through a network 20 and will be used to transmit the parameters of preset correspondence relationship, in which the display screen parameters of the display screen 1 match with the lighting state of the background environment within the viewing angle of the user, to the cloud 30 for synchronizing. Similarly, the cloud 30 may synchronize the parameters of preset correspondence relationship in which the display screen parameters of the display screen 1 match with the state of the background environment within the viewing angle range of the user.

The cloud stores the user habit list corresponding to the user. The user habit list comprises a user ID corresponding to the user, display parameters of the display screen, lighting state and preset correspondence relationship in which the display parameters match with the lighting state of the background environment within the viewing angle range of the user.

The cloud may obtain the use ID, display parameters of the display screen, lighting state and the preset correspondence relationship between the display parameters and the lighting state of the background environment within the viewing angle range of the user through the data uploaded by the terminal. Then, a user habit record is generated, and recorded in the user habit list. Wherein, there are many means for generating the correspondence relationship, and the means may be generated according to user statistical analysis, a predetermined algorithm, a predetermined model and so on. By means of each user's adjustment record, a very complete user habit list may be generated. When the terminal device used by the user is in a certain lighting state, the display parameters of the display screen suitable for the user based on the user habit list may be directly obtained.

Further, the cloud 30 may perform big data statistics and analysis with the preset correspondence relationship data to provide data for multiple information terminals 10 accessing the cloud 30. The cloud 30 may perform data analysis on parameters of the preset correspondence relationship from multiple information terminals 10, and generate the parameters of preset correspondence relationship adaptive to the common and the minority, so that each information terminal 10 synchronizes the parameters of the preset correspondence relationship between the display parameters of display screen and the lighting state of the background environment within the viewing angle range of the user through the cloud 30 required by respective common and minority.

Big data statistics and analysis is performed on data of multiple user lists. When collecting user data, the user's age, gender, and occupation etc., may be collected. And for the different categories of people, the data collected for them are given different weights.

For example, in case of calculating the preset correspondence relationship parameter adaptive to the common, you may consider the age structure for the user relating to the ages of 20-30 and over 40 years old. For example, 70% of users are 20-30 years old, and the rest are users over 40 years old. In the calculation, 70% weighting may be applied to the display parameters, illumination parameter and the preset correspondence parameter in which display parameters match with the lighting state parameter of the background environment within the viewing angle range of the user for the data of 20-30 years old user, and 30% is weighted and calculated for the data of users over 40 years old. The above data is just an exemplary example.

As for the different occupations, minors/adults and so on. The users who have obvious differences in usage habits can refer to the above methods and employ weighted algorithm to obtain universally display parameters that are more suitable for the common. The above process is a self-adaptive adjustment process on the display parameters and the lighting state of the background environment based on the cloud data. Further, in a preferable embodiment, the adjusting device may be further used for adjusting the display parameters of the display screen according to the personalization requirement of the user after the adaptive adjustment.

The user adjusts the parameters of the display screen through the adjustment device according to the perception of the background lighting and the display parameter of the display screen based on the display parameters of the display screen after the adaptive adjustment. After the information terminal 10 receives the display parameter adjustment, it sends the corrected parameters of the display screen and the lighting state parameters of the background environment within the viewing angle range of the user to the cloud 30, and loads the user information recorded by the information terminal in the uploading data processing, such as the gender, age and occupation of the user, to classify and summarize the data. And the cloud 30 according to the received data, changes the original preset correspondence relationship, which is corresponding to the correspondence display parameters of the user under the background lighting parameters, and generates the corrected correspondence relationship.

In a specific calculation method, the cloud calculates the degree and amount of deviation between the corrected correspondence relationship and the preset correspondence relationship, and performs weight processing on the preset correspondence relationship and the corrected corresponding relationship that reaches the first deviation amount and less than the first deviation threshold, thereby it generates a universal preset correspondence relationship of the first range.

Weight processing on the preset correspondence relationship and the corrected correspondence relationship that reaches the second deviation amount and less than the second threshold is performed, thereby a peculiar preset correspondence relationship of the second rang is generated.

That is, in the above-mentioned algorithm, the data whose deviation degree is smaller than the first deviation threshold and the number of samples which reaches the first deviation amount are employed to calculate the universal preset correspondence relationship of the first range. And the data whose deviation degree is larger than the first range and smaller than the second range and the number of samples which reaches the second deviation amount is employed to calculate the peculiar preset correspondence relationship of the second range.

When generating a universal preset correspondence relationship which is adaptable to the first range and a peculiar preset correspondence relationship adaptable to the second range, different data correction weight coefficients are considered to be given to the different user attributes. The universal preset correspondence relationship of the first range and the peculiar preset correspondence relationship of the second range are obtained through the normalization processing. It includes that the cloud determines the user properties corresponding to the corrected correspondence relationship, determines the data correction weight coefficient according to the user properties, performs the data analysis processing on the parameter of the corrected correspondence relationship according to the data correction weight coefficient, obtains parameters of a normalized correction correspondence relationship, performs data analysis on the correspondence relationship in which the display parameters of display screen match with the lighting state of the background environment within the viewing angle range of the user and the parameters of a normalized correction correspondence relationship, and generates the universal preset correspondence relationship adaptable to the first range and the particular preset correspondence relationship adaptable to the second range.

The personalized parameter adjustment may further change the universal preset correspondence relationship of the cloud.

When the display parameter correspondence relationship of a certain user under a certain lighting state of background environment is corrected, the statistics data of the universal preset correspondence relationship under this lighting state of the background environment based on the big data analytics is changed. The universality calculation at this time needs to be considered the parameters of the preset correspondence relationship from multiple information terminals, and the parameters of the corrected correspondence relationship of the information terminal from the personalized user to perform data analysis, thereby, a new universal preset correspondence relationship and a new particular preset correspondence relationship adaptive to the minority are generated.

Therefore, after the self-adaptive parameters are adjusted, the users perform data collection for personalized adjustment to the display parameters of the information terminals, and the universal preset correspondence relationship will be dynamically adjusted with the data collection, and tend to be a reasonable range that the common can accept.

Similarly, the dynamic adjustment of the particular preset correspondence relationship for a particular niche will also change correspondingly with the user customized display data. However, it should be noted that difference between the particular preset correspondence relationship and the universal preset correspondence relationship, is that the data base is different from data base which is based on as the universal preset correspondence relationship is adjusted, because the particular preset correspondence relationship is only related to certain special groups, such as the woman aged 20-30, and children under 16 in beijing city etc.,. As the particular preset correspondence relationship of the specific groups is adjusted, the sampling range of data to be corrected is merely the specific group. Therefore, on basis of the user's customized parameter adjustment, the change of the parameters of the universal preset correspondence relationship and the particular preset corresponding relationship must be different.

The embodiments of the present invention provide an information terminal, which may sample the illumination of background environment based on viewing angle range of a user, adjust the display parameters such as the brightness and the color temperature of the display screen according to the state parameters of the background environment obtained by sampling, and adjust the brightness, color temperature and other display parameters to match with the lighting state of the background environment within the viewing of the user, so that the screen display is matched with the visual perception of the user, therefore the visual fatigue of the user during use is effectively reduced and the visual health of the user is protected.

A person skilled in the art should be further understood that the units and algorithm steps of each example described in connection with the embodiments disclosed herein can be implemented in electronic hardware, computer software or a combination of both, in order to clearly illustrate the alternative of hardware and software, the composition and steps of the examples have been generally described in terms of functions in the above description. Whether these functions are performed in hardware or software depends on the specific application and design constraints of technical solutions. A person skilled in the art can use different methods for implementing the described functions for each particular application, but such implementation should not be considered to be beyond the scope of the present invention.

The steps of the method or algorithm described in connection with the embodiments disclosed herein can be implemented in hardware, a software module executed by a processor, or a combination of both. The software module can be placed in random access memory (RAM), memory, read only memory (ROM), electrically programmable ROM, electrically erasable programmable ROM, registers, hard disk, removable disk, CD-ROM, or any other form of storage medium known in the art.

Above mentioned specific embodiments further describe aims, technical solutions and beneficial effects of the present invention in detail, it should be understood that the above mentioned is merely specific embodiment of the present invention without limiting a protection scope of the present invention, and any modifications, equivalent substitutions, improvement, etc. made within the spirit and principle of the present invention should be included in the scope of the present invention.

What is claimed is:

1. An information terminal, comprising a display screen and a communication device, wherein the information terminal further comprises a camera, a photo capturing unit, a photo gray level analysis unit and a display-screen display-parameter-adjustment unit, and the camera is used for acquiring a photo analog signal and a digital signal of a background environment within a viewing angle range of a user;

the photo capturing unit is connected to the camera through the communication device, for converting the photo analog signal or the photo digital signal acquired by the camera into digital photo data, the photo gray level analysis unit analyzes a gray level of the photo data, generates state parameters of the background environment within the viewing angle range of a user according to configuration parameters of the camera, and sends the same to the display-screen display-parameter-adjustment unit, and the display-screen display-parameter-adjustment unit adjusts the display parameters of the display screen according to the state parameters of the background environment on the basis of the preset correspondence relationship, so that the display parameters of the display screen match with the lighting state of the background environment within the viewing of the user, and wherein the display parameters at least include brightness and/or color temperature, the display-screen display-parameter-adjustment unit comprises an adjustment device for adjusting the display parameters of the display screen, and after the display parameters are adjusted, the preset correspondence relationship between the display parameters and the lighting state of the background environment within the viewing angle range of the user is changed, and a corrected correspondence relationship is generated;

wherein the information terminal is connected to a cloud through a network, for transmitting parameters of the preset correspondence relationship in which the display parameters of the display screen match with the lighting state of the background environment within the viewing angle of the user to the cloud for synchronization, and the cloud stores a user habit list corresponding to the user, which includes a user ID corresponding to the user, the display parameters of the display screen, the lighting state and the preset correspondence relationship in which the display parameters match with the lighting state of the background environment within the viewing angle range of the user;

wherein the cloud performs data analysis on the correspondence relationship in which the display parameters of the display screen match with the lighting state of the background environment within the viewing angle range of the user, and the parameters of the corrected correspondence relationship, and a universal preset correspondence relationship adaptive to a first viewing angle range and a peculiar preset correspondence relationship adaptive to a second viewing angle range are generated.

2. The information terminal according to the claim 1, wherein the cloud performs data analysis comprises :
the cloud calculating
a degree and amount of deviation between the corrected correspondence relationship and the preset correspondence relationship, and performing weight processing on the preset correspondence relationship and the corrected correspondence relationship that reach a first deviation amount and less than a first deviation threshold, thereby a universal preset correspondence relationship of the first viewing angle range is generated, and
performing weight processing on the preset correspondence relationship and the corrected correspondence relationship that reach a second deviation amount and less than a second threshold, thereby a peculiar preset correspondence relationship of the second viewing angle range is generated.

3. The information terminal according to claim 1, wherein the universal preset correspondence relationship is get from the cloud through the information terminal of the common user, thereby being matched with the universal preset correspondence relationship in which the display parameters of the display screen and the lighting state of the background environment with the viewing angle range of the user, and the particular preset correspondence relationship is get from the cloud through the information terminal of the special user, thereby being matched with the particular preset correspondence relationship in which the display parameters of the display screen and the lighting state of the background environment within the viewing angle range of the user.

4. The information terminal according to the claim 1, wherein that the cloud performs data analysis with the correspondence relationship in which the display parameters of the display screen match with the lighting state of the background environment within the viewing angle range of the user and the parameters of the corrected correspondence relationship, and generates a universal preset correspondence relationship adaptive to the first viewing angle range and a peculiar preset correspondence relationship adaptive to the second viewing angle range, comprises:

the cloud determining user properties corresponding to the corrected correspondence relationship,
the cloud determining the data correction weight coefficient according to the user properties,
the cloud performing the data analysis processing on the parameters of the corrected correspondence relationship according to the data correction weight coefficient, and obtaining parameters of a normalized correction correspondence relationship, and
the cloud performing data analysis on the correspondence relationship in which the display parameters of the display screen match with the lighting state of the background environment within the viewing angle range of the user and the parameters of a normalized correction correspondence relationship, and generating the universal preset correspondence relationship adaptive to the first viewing angle range and the particular preset correspondence relationship adaptive to the second viewing angle range.

5. The information terminal according to the claim 1, wherein the photo capturing unit further comprises:
generating a counter-compensation parameter according to the type parameter of the camera and/or a self-compensation parameter, and converting the photo analog signal or the photo digital signal acquired by the camera into the digital photo data based on the counter-compensation parameter.

6. An information terminal, comprising a display screen and a communication device, wherein the information terminal further comprises a camera, a photo capturing unit, a photo gray level analysis unit and a display-screen display-parameter-adjustment unit, and the camera is used for acquiring a photo analog signal and a digital signal of a background environment within a viewing angle range of a user;

the photo capturing unit is connected to the camera through the communication device, for converting the photo analog signal or the photo digital signal acquired by the camera into digital photo data, the photo gray level analysis unit analyzes a gray level of the photo data, generates state parameters of the background environment within the viewing angle range of a user according to configuration parameters of the camera, and sends the same to the display-screen display-parameter-adjustment unit, and the display-screen display-parameter-adjustment unit adjusts the display parameters of the display screen according to the state parameters of the background environment on the basis of the preset correspondence relationship, so that the display parameters of the display screen match with the lighting state of the background environment within the viewing of the user, and wherein the display parameters at least include brightness and/or color temperature;

wherein that adjusts the display parameters of the display screen according to the state parameters of the background environment comprises:

determining an absolute value of a target brightness according to the state parameters of background environment and the preset correspondence relationship;

determining a percentage of a display brightness of the display screen according to the absolute value of the target brightness; and outputting an actual display brightness corresponding to the absolute value of the target brightness according to the percentage of a display brightness of the display screen, wherein the actual display brightness of the display screen and a maximum absolute value of brightness of the display screen are calibrated in advance through the percentage of the display brightness.

7. The information terminal according to claim 6, wherein the information terminal is connected to a cloud through a network, for transmitting parameters of the preset correspondence relationship in which the display parameters of the display screen match with the lighting state of the background environment within the viewing angle of the user to the cloud for synchronization, and the cloud stores a user habit list corresponding to the user, which includes a user ID corresponding to the user, the display parameters of the display screen, the lighting state and the preset correspondence relationship in which the display parameters match with the lighting state of the background environment within the viewing angle range of the user.

8. The information terminal according to the claim 7, wherein the display-screen display-parameter-adjustment unit comprises an adjustment device for adjusting the display parameters of the display screen, and after the display parameters are adjusted, the preset correspondence relationship between the display parameters and the lighting state of the background environment within the viewing angle range of the user is changed, and a corrected correspondence relationship is generated.

9. The information terminal according to the claim 6, wherein the photo capturing unit further comprises:

generating a counter-compensation parameter according to the type parameter of the camera and/or a self-compensation parameter, and converting the photo analog signal or the photo digital signal acquired by the camera into the digital photo data based on the counter-compensation parameter.

\* \* \* \* \*